(12) United States Patent
Peng et al.

(10) Patent No.: US 11,740,471 B2
(45) Date of Patent: Aug. 29, 2023

(54) DISPLAY DEVICE WITH TRANSPARENT ILLUMINATOR

(71) Applicant: META PLATFORMS TECHNOLOGIES, LLC, Menlo Park, CA (US)

(72) Inventors: Fenglin Peng, Redmond, WA (US); Ying Geng, Bellevue, WA (US); Lu Lu, Kirkland, WA (US); Yun-Han Lee, Redmond, WA (US); Alexander Koshelev, Redmond, WA (US); Giuseppe Calafiore, Redmond, WA (US); Jacques Gollier, Sammamish, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 14 days.

(21) Appl. No.: 17/401,160

(22) Filed: Aug. 12, 2021

(65) Prior Publication Data

US 2022/0179211 A1    Jun. 9, 2022

Related U.S. Application Data

(63) Continuation-in-part of application No. 17/321,121, filed on May 14, 2021.
(Continued)

(51) Int. Cl.
*G02F 1/1335* (2006.01)
*G02B 27/01* (2006.01)
(Continued)

(52) U.S. Cl.
CPC ......... *G02B 27/0172* (2013.01); *G02B 6/005* (2013.01); *G02B 6/0078* (2013.01);
(Continued)

(58) Field of Classification Search
CPC ............ G02F 1/1335; G02F 1/133524; G02F 1/133526; G02F 1/133536;
(Continued)

(56) References Cited

U.S. PATENT DOCUMENTS 7,508,466 B2   3/2009   Hutchins
8,416,363 B2   4/2013   Shikii et al.
(Continued)

FOREIGN PATENT DOCUMENTS

WO   2017041079 A1   3/2017
WO   2017065819 A1   4/2017
(Continued)

OTHER PUBLICATIONS

Fattal D., et al., "A Multi-Directional Backlight for a Wide-Angle, Glasses-Free Three-Dimensional Display," Nature, vol. 495, No. 7441, Mar. 20, 2013, pp. 348-351.
(Continued)

*Primary Examiner* — Thoi V Duong
(74) *Attorney, Agent, or Firm* — PEQUIGNOT + MYERS; Matthew A. Pequignot

(57) ABSTRACT

A display device with a transparent illuminator and an liquid crystal (LC) display panel is disclosed. The transparent illuminator includes a light source and a transparent lightguide, which may be based on a slab of transparent material with zigzag light propagation of the illuminating light in the slab and/or a transparent photonic integrated circuit with singlemode ridge waveguides for spreading the illuminating light in a plane parallel to the plane of LC display panel. The lightguide includes a plurality of grating out-couplers whose position is coordinated with positions of LC pixels for higher throughput. A reflective offset-to-angle optical element may be provided to form an image in angular domain through the LC panel and through the transparent illumina-
(Continued)

tor, resulting in an overall compact and efficient display configuration.

19 Claims, 9 Drawing Sheets

Related U.S. Application Data

(60) Provisional application No. 63/121,494, filed on Dec. 4, 2020.

(51) Int. Cl.
*F21V 8/00* (2006.01)
*G02F 1/13357* (2006.01)

(52) U.S. Cl.
CPC ... *G02B 27/0179* (2013.01); *G02F 1/133536* (2013.01); *G02F 1/133553* (2013.01); *G02B 2027/0178* (2013.01); *G02B 2027/0187* (2013.01); *G02F 1/133524* (2013.01); *G02F 1/133526* (2013.01); *G02F 1/133606* (2013.01); *G02F 1/133621* (2013.01)

(58) Field of Classification Search
CPC ............. G02F 1/133553; G02F 1/1336; G02F 1/133606; G02F 1/133615; G02F 1/13362; G02F 1/133622; G02B 6/005; G02B 6/0078; G02B 6/0028; G02B 6/124; G02B 6/0035; G02B 27/0172; G02B 27/0179; G02B 27/0093; G02B 2006/12097; G02B 2006/1215; G02B 2027/0178; G02B 2027/0187
See application file for complete search history.

(56) References Cited

U.S. PATENT DOCUMENTS

| | | | |
|---|---|---|---|
| 8,692,258 B2 | 4/2014 | Kim et al. | |
| 8,848,132 B2 | 9/2014 | O'Neill et al. | |
| 10,379,419 B1 | 8/2019 | Lu et al. | |
| 10,613,376 B2 | 4/2020 | Aieta | |
| 10,684,404 B2 | 6/2020 | Fattal | |
| 2002/0167619 A1 | 11/2002 | Bietsch et al. | |
| 2010/0157200 A1* | 6/2010 | Mun | G02B 6/0056 362/621 |
| 2013/0100695 A1 | 4/2013 | Yankov et al. | |
| 2013/0155477 A1 | 6/2013 | Yankov et al. | |
| 2014/0176413 A1 | 6/2014 | Jung et al. | |
| 2015/0370074 A1 | 12/2015 | McDowall et al. | |
| 2017/0205554 A1 | 7/2017 | Hong et al. | |
| 2017/0255015 A1 | 9/2017 | Geng et al. | |
| 2017/0371203 A1 | 12/2017 | Gao et al. | |
| 2018/0024286 A1* | 1/2018 | Schubert | G02B 6/0075 362/553 |
| 2018/0067251 A1 | 3/2018 | Baldwin et al. | |
| 2018/0227576 A1* | 8/2018 | Fattal | H04N 13/32 |
| 2018/0356597 A1 | 12/2018 | Spector et al. | |
| 2020/0117006 A1* | 4/2020 | Kollin | G02B 27/0179 |
| 2020/0285104 A1 | 9/2020 | Meng et al. | |
| 2020/0359004 A1 | 11/2020 | Saari et al. | |
| 2021/0072593 A1 | 3/2021 | Meng et al. | |

FOREIGN PATENT DOCUMENTS

| | | |
|---|---|---|
| WO | 2017123259 A1 | 7/2017 |
| WO | 2020042605 A1 | 3/2020 |

OTHER PUBLICATIONS

International Search Report and Written Opinion for International Application No. PCT/US2021/061916, dated Mar. 28, 2022, 14 pages.
International Search Report and Written Opinion for International Application No. PCT/US2021/061919, dated Mar. 29, 2022, 11 pages.
International Preliminary Report on Patentability for International Application No. PCT/US2021/061916, dated Jun. 15, 2023, 11 pages.
International Preliminary Report on Patentability for International Application No. PCT/US2021/061919, dated Jun. 15, 2023, 9 pages.

* cited by examiner

DISPLAY DEVICE WITH TRANSPARENT ILLUMINATOR

REFERENCE TO RELATED APPLICATIONS

This application claims priority from U.S. Provisional Patent Application No. 63/121,494 entitled "Patterned Backlight for Display Panel", filed on Dec. 4, 2020, and is a continuation-in-part of the U.S. Utility patent application Ser. No. 17/321,121 entitled "Patterned Backlight for Display Panel", filed on May 14, 2021, which claims priority from U.S. Provisional Patent Application No. 63/121,494 entitled "Patterned Backlight for Display Panel", filed on Dec. 4, 2020, all of which being incorporated herein by reference in their entireties.

TECHNICAL FIELD

The present disclosure relates to visual display devices and related components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays, such as TV sets, display images to several users, and some visual display systems, such s near-eye displays or NEDs, are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices can benefit from a compact and efficient configuration, including efficient illuminators providing a uniform illumination of a display panel, as well as high-throughput ocular lenses and other optical elements.

BRIEF DESCRIPTION OF THE DRAWINGS

Exemplary embodiments will now be described in conjunction with the drawings, in which.

DETAILED DESCRIPTION

Figure 1:
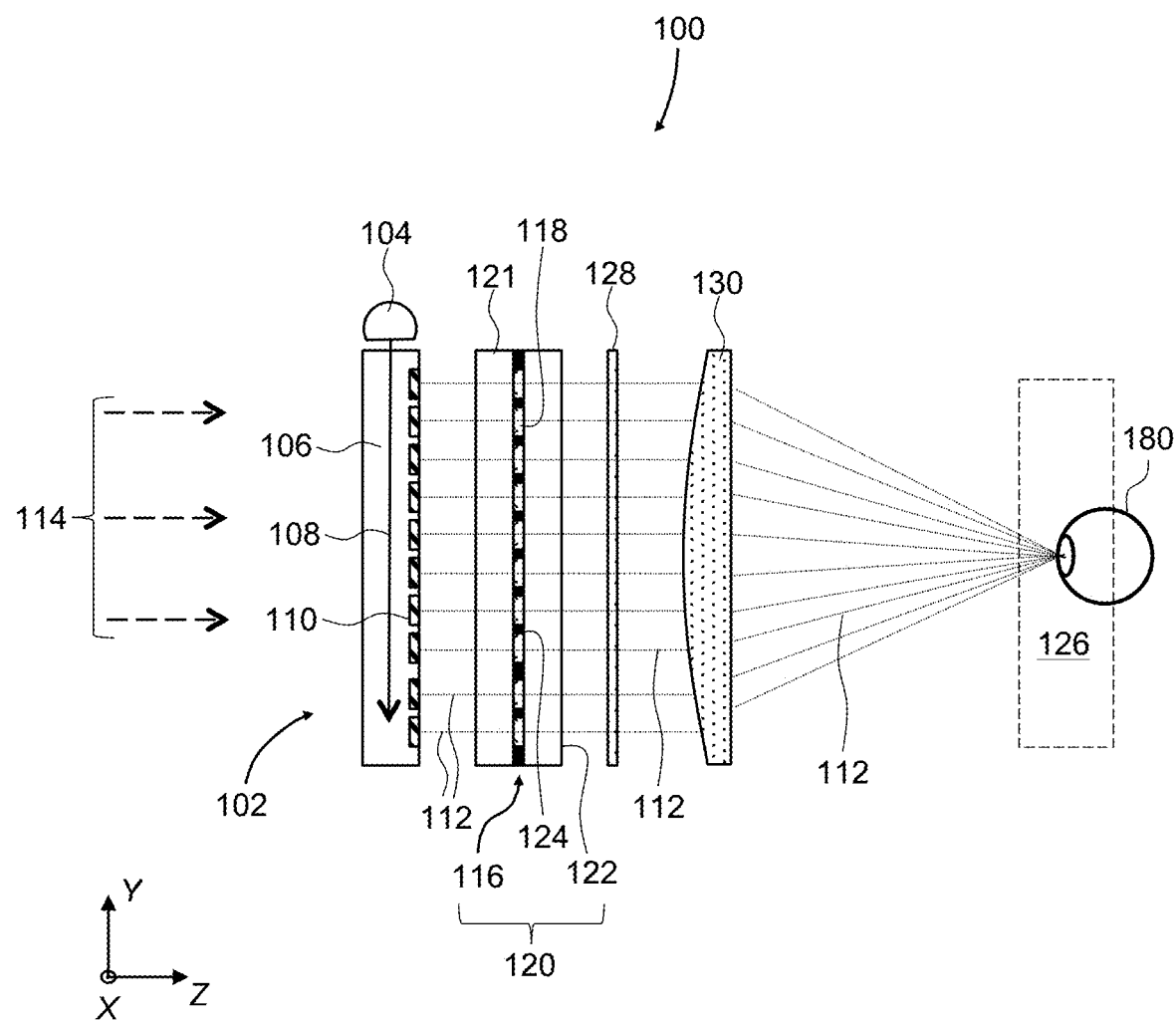
FIG. 1 is a schematic cross-sectional view of a display device including an array of polarization tuning pixels.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated. In FIGS. 1-3, 4A-4B, and FIGS. 5-8, similar reference numerals generally refer to similar elements.

In a visual display including an array of pixels coupled to an illuminator, the efficiency of light utilization depends on a ratio of a geometrical area occupied by pixels to a total area of the display panel. For miniature displays often used in near-eye and/or head-mounted displays, the ratio can be lower than 50%. The efficient backlight utilization can be further hindered by color filters on the display panel which on average transmit no more than 30% of incoming light. On top of that, there may exist a 50% polarization loss for polarization-based display panels such as liquid crystal (LC) display panels. All these factors considerably reduce the light utilization and overall wall plug efficiency of the display, which is undesirable.

In accordance with this disclosure, light utilization and wall plug efficiency of a backlit display may be improved by providing an illuminator including a transparent lightguide supporting an array of grating out-couplers aligned with pixels of the display panel. A center wavelength of light emitted by the illuminator may be selected to match a transmission wavelength of color sub-pixels, to increase the throughput. Furthermore, in displays where the illuminator emits light of primary colors, e.g. red, green, and blue, a color filter layer may be omitted altogether. For polarization-based displays, the polarization of the emitted light may be matched to a pre-defined input polarization state. Matching the spatial distribution, transmission wavelength, and the transmitted polarization characteristics of the pixels of the display panel enables one to considerably improve the useful portion of display light that is not absorbed or reflected by the display panel on its way to the eyes of the viewer, and consequently to considerably improve the display's wall plug efficiency.

The transparency of lightguide-based illuminators of this disclosure enables configurations where an ocular lens converting an image in linear domain displayed by the pixel array into an image in angular domain at the eyebox may be replaced with an ocular reflector reflecting the illuminating light back through the transparent lightguide. This results in a more compact overall configuration and enables a further improvement of the wall plug efficiency of a display as compared e.g. to a display with pancake type ocular lens that typically has an optical throughput not exceeding 25%. For VR display applications, the transparency of the lightguide-based illuminator enables new display configurations e.g. including an eye tracking system placed behind the display panel in direct view of the user's eyes.

In accordance with the present disclosure, there is provided a display device comprising an illuminator and an liquid crystal (LC) layer downstream of the illuminator. The illuminator includes a light source, a transparent lightguide for spreading light emitted by the light source along a plane parallel to the transparent lightguide, and an array of gratings optically coupled to the transparent lightguide for out-coupling portions of the light propagating in the transparent lightguide. The LC layer includes an array of polarization-tuning pixels. Positions of the gratings are coordinated with positions of the polarization-tuning pixels to propagate the portions of the light out-coupled from the transparent lightguide by the gratings through the corresponding polarization-tuning pixels. The gratings may be configured for at least partial focusing of the light portions through the corresponding polarization-tuning pixels.

The light source may be configured to emit the light in a first polarization state, and the transparent lightguide may substantially preserve the first polarization state of the light emitted by the light source. The light source may be configured to emit the light at a wavelength of one or few color channels. For instance, the light source may be configured to emit the light at wavelengths of first, second, second and third color channels. The light of the first, second, and third color channel may be emitted in a time-sequential manner. In some embodiments, the display device further includes a grid layer adjacent the LC layer, for defining boundaries of the polarization-tuning pixels of the array of polarization-tuning pixels, and/or a substrate adjacent the LC layer, the substrate comprising an array of transparent electrode segments defining the array of polarization-tuning pixels.

A polarizer may be disposed downstream of the LC layer, for transmitting light in a first polarization state while rejecting light in a second, orthogonal polarization state. The display device may further include an eyebox downstream of the LC layer, and an offset-to-angle element, e.g. an ocular lens, disposed in an optical path between the LC layer and the eyebox for converting an image in linear domain at the LC layer into an image on angular domain at the eyebox. The offset-to-angle element may be configured to redirect the light portions propagated through the LC layer back through the transparent lightguide for forming the image in angular domain. In this configuration, the eyebox and the offset-to-angle element of this embodiment are disposed on an opposite sides of the transparent lightguide.

The offset-to-angle element may include a first component comprising a reflective polarizer, and a second component downstream of the first component, the second component comprising a reflector layer. In operation, the out-coupled light portions may propagate through the reflective polarizer, get reflected by the reflector layer, propagate back to the reflective polarizer, get reflected thereby, propagate again to the reflector layer, get reflected thereby, propagate back through the transparent lightguide, and form the image in angular domain at the eyebox. The reflector layer may include a full reflector, i.e. a reflector that substantially does not transmit any light through the reflector. The reflector may also be a partial reflector that does transmit some light. In such embodiments, the display device may further include an eye-tracking camera behind the partial reflector for taking images of a user's eye at the eyebox through the offset-to-angle element.

The transparent lightguide may include a slab of transparent material for propagating the light therein in a zigzag pattern by a series of consecutive total internal reflections from opposed parallel surfaces of the slab. The array of gratings is supported by the slab. In some embodiments, the transparent lightguide comprises a substrate, a dispatching circuit supported by the substrate, and an array of linear waveguides supported by the substrate and running along polarization-tuning pixels of the array of polarization-tuning pixels. The dispatching circuit is configured for receiving the light from the light source and split the light between the linear waveguides, and the gratings are optically coupled to the linear waveguides for out-coupling the light portions from the linear waveguides to propagate through corresponding polarization-tuning pixels of the array of polarization-tuning pixels.

In accordance with the present disclosure, there is provided a display device comprising an illuminator and an LC layer optically coupled to the illuminator. The illuminator includes light source, a slab of transparent material coupled to the light source for propagating the light therein in a zigzag pattern by a series of consecutive total internal reflections from opposed parallel surfaces of the slab, and an array of gratings supported by the slab for out-coupling portions of the light propagating in the slab. The LC layer includes an array of polarization-tuning pixels. Positions of the gratings are coordinated with positions of the polarization-tuning pixels to propagate the portions of the light out-coupled from the slab of transparent material by the gratings through the corresponding polarization-tuning pixels.

The display device may further include an eyebox downstream of the LC layer, and a reflective offset-to-angle element in an optical path between the LC layer and the eyebox, for converting an image in linear domain at the LC layer into an image on angular domain at the eyebox. The reflective offset-to-angle element may be configured to redirect the light portions propagated through the LC layer back through the slab of transparent material for forming the image in angular domain. The eyebox and the offset-to-angle element are disposed on opposite sides of the slab of transparent material.

In some embodiments, the reflective offset-to-angle element includes a first component comprising a reflective polarizer, and a second component downstream of the first component, the second component comprising a reflector layer. In operation, the out-coupled light portions propagate through the reflective polarizer, get reflected by the reflector layer, propagate back to the reflective polarizer, get reflected thereby, propagate again to the reflector layer, get reflected thereby, propagate back through the slab of transparent material, and form the image in angular domain at the eyebox.

In accordance with the present disclosure, there is further provided a display device comprising an illuminator and an LC layer optically coupled to the illuminator. The illuminator includes a light source and a transparent lightguide comprising a substrate, a dispatching circuit supported by the substrate, an array of linear waveguides supported by the substrate, and an array of gratings optically coupled to the array of linear waveguides. The dispatching circuit is configured for receiving the light from the light source and split light emitted by the light source between the linear waveguides, and wherein the gratings are configured to out-couple portions of the light from the linear waveguides. The LC layer includes an array of polarization-tuning pixels. The linear waveguides are running along the polarization-tuning pixels of the LC layer. Positions of the gratings are coordinated with positions of the polarization-tuning pixels to propagate the portions of the light beams out-coupled from the linear waveguides by the gratings through the corresponding polarization-tuning pixels.

In some embodiments, the display device further includes an eyebox downstream of the LC layer, and a reflective offset-to-angle element in an optical path between the LC layer and the eyebox, for converting an image in linear domain at the LC layer into an image on angular domain at the eyebox. The reflective offset-to-angle element is configured to redirect the light portions propagated through the LC layer back through the transparent lightguide for forming the image in angular domain. The eyebox and the offset-to-angle element are disposed on opposite sides of the transparent lightguide in this embodiment. The reflective offset-to-angle element may include a first component comprising a reflective polarizer, and a second component downstream of the first component, the second component comprising a reflector layer. In operation, the out-coupled light portions propagate through the reflective polarizer, get reflected by the reflector layer, propagate back to the reflective polarizer, get reflected thereby, propagate again to the reflector layer, get reflected thereby, propagate back through the transparent lightguide, and form the image in angular domain at the eyebox.

Referring now to FIG. 1, a display device 100 includes an illuminator 102 having a light source 104; a transparent lightguide 106 for spreading light 108 emitted by the light source 104 along a plane parallel to the transparent lightguide 106, i.e. in XY plane; and an array of gratings 110 optically coupled to the transparent lightguide 106 for out-coupling portions 112 of the light 108 propagating in the transparent lightguide 106. The gratings 110 may be directly supported by the transparent lightguide 106, e.g. they may be immersed into the transparent lightguide 106 as shown. Herein, the term "transparent lightguide" means that the lightguide propagates at least a useful portion, e.g. 10% or more, of ambient light 114, as well as other light that may propagate directly through the transparent lightguide 106.

The display device 100 further includes a liquid crystal (LC) layer 116 disposed downstream of the illuminator 102. The LC layer 116 includes an array of polarization-tuning pixels 118 in a thin layer of LC fluid between first 121 and second 122 substrates of an LC cell 120. The polarization-tuning pixels 118 may be formed e.g. by an array of transparent electrode segments supported by the first substrate 121, and by a common backplane electrode supported by the second substrate 122. The first 121 and/or second 122 substrates may also include a grid layer 124 adjacent the LC layer 116, for defining boundaries between the polarization tuning pixels 118. Herein, the term "polarization tuning" includes polarization rotation, changing ellipticity and/or handedness of circular or elliptically polarized light, etc.; in other words, any change of the state of polarization of incoming light, the change being controllable by application of an external signal to a particular pixel of the LC layer 116.

In the display device 100, positions of the gratings 110 are coordinated with positions of the polarization-tuning pixels 118 to propagate the portions 112 of the light 108 out-coupled from the transparent lightguide 106 by the gratings 110 through the corresponding polarization-tuning pixels 118. Herein, the term "coordinated positions" when applied to elements of two arrays of elements means that the positions of the elements of the two arrays in XY plane overlap or correspond to each other, e.g. have equal X-pitch and Y-pitch, or more generally having X-pitch of the first array an integer multiple of the X-pitch of the second array, and having Y-pitch of the first array an integer multiple of the Y-pitch of the second array.

The display device 100 may further include a polarizer 128 downstream of the LC layer 116. The polarizer 128 may be configured to pass through light in a first polarization state while rejecting light in a second, orthogonal polarization state. The portions 112 of the light 108 propagated through the polarization-tuning pixels 118 will be attenuated by the polarizer 128 depending on their respective polarization state that may be controllably changed by the polarization-tuning pixels 118. For example, the first polarization state may be a linear polarization, e.g. Y-polarization, and the second polarization state may be an orthogonal linear polarization i.e. X-polarization, or vice versa. In other embodiments, the first polarization component may be left-circular polarization, and the second polarization component may be a right-circular polarization, or vice versa. To avoid polarization optical losses, the light source 104 may be configured to emit the light 108 in the first polarization state. The transparent lightguide may be constructed to substantially preserve the polarization state of the light it spreads in XY plane.

The display device 100 may further include an ocular lens 130 in an optical path between the LC layer 116 and the eyebox 126, downstream of the polarizer 128. The purpose of the ocular lens 130 is to convert an image in linear domain at the LC layer 116 into an image on angular domain at the eyebox 126 where it can be directly observed by a user's eye. More generally, the ocular lens 130 is but one type of an offset-to-angle ocular element which may be a refractive, reflective, and/or diffractive element having optical power, i.e. focusing or defocusing power. As implied by its name, the offset-to-angle ocular element performs the function of converting an image in linear domain at the LC layer 116 into an image on angular domain at the eyebox 126. An image in angular domain may be directly observed by a user's eye 180 at an eyebox 126 of the display device 100.

Figure 2:
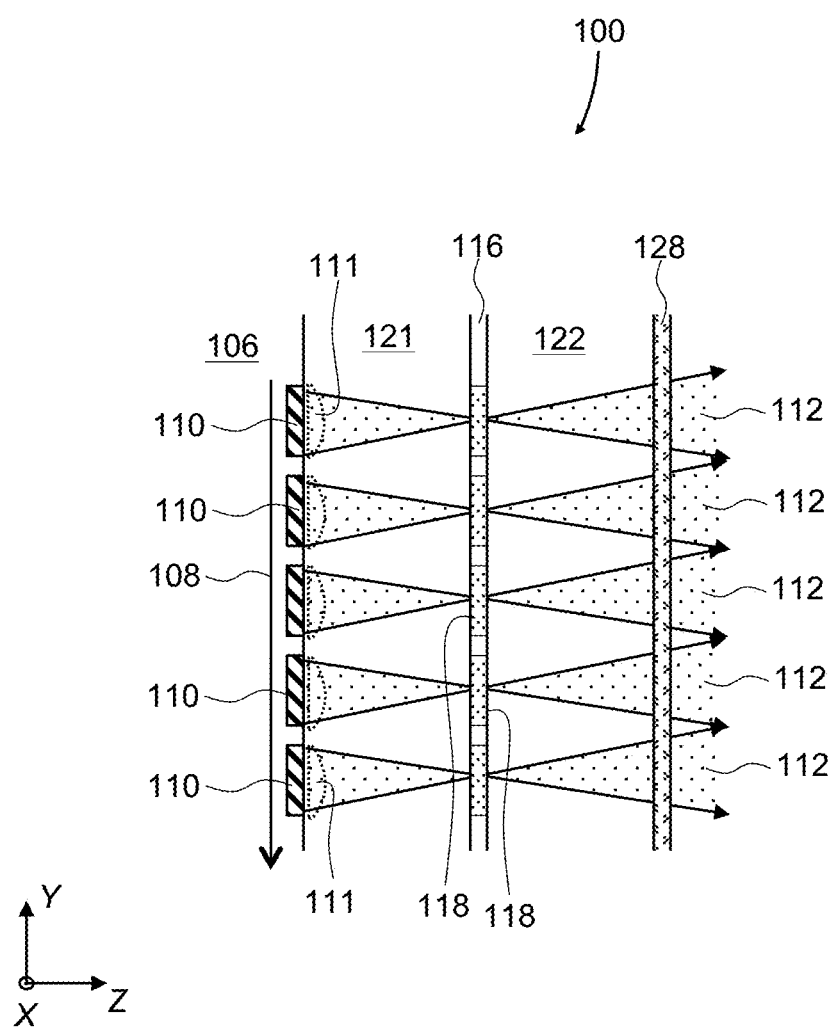
FIG. 2 is a magnified view of FIG. 1 showing gratings focusing of the out-coupled light through the polarization tuning pixels.

In some embodiments, the gratings 110 may be configured to at least partially focus the light portions 112 through the corresponding polarization-tuning pixels 118. Referring to FIG. 2 for an example, each grating 110 focuses the light portion 112 it out-couples through the corresponding polarization-tuning LC pixel 118. To that end, the grating 110 may be chirped in pitch. In some embodiments, microlenses 111 may be provided to assist the focusing, or to provide the focusing of the light portions 112 in both XZ and YZ planes. The focusing can serve two purposes, firstly to increase the portion of light propagated through the polarization-tuning LC pixels 118, and secondly to increase the divergence of the light portions 112 at the polarization-tuning LC pixels 118, which allows one to increase the size of the eyebox 126. Configuring the light source 104 to emit the light 108 in a well-defined polarization state also facilitates the increase the throughput and wall plug efficiency of the display device 100. Furthermore, the light source 104 may be configured to emit the light at a wavelength of a specific color channel, to avoid or reduce optical losses due to spectral filtering by the LC cell 120. The light source 104 may be further configured to emit the light at wavelengths of other color channels in a time-sequential manner to further improve optical throughput and light utilization by the display device 100.

Figure 3:
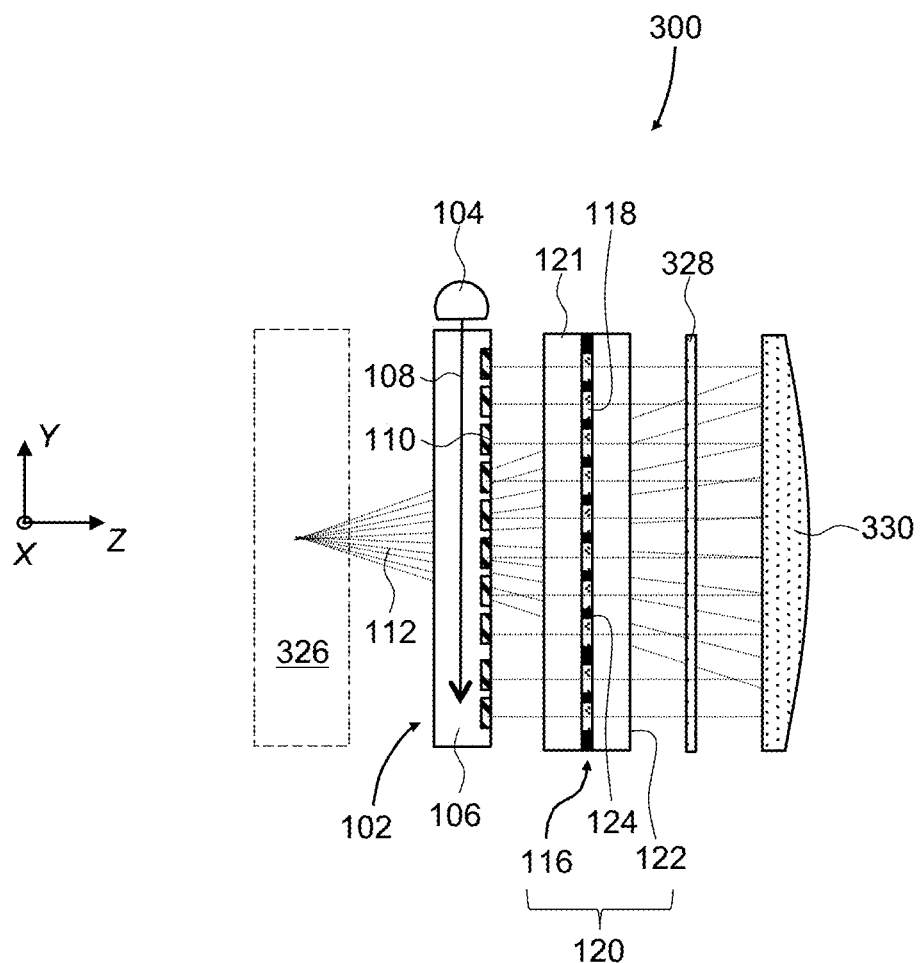
FIG. 3 is a schematic cross-sectional view of a display device with a reflective offset-to-angle element.

Turning to FIG. 3, a display device 300 is similar to the display device 100 of FIG. 1, and includes similar elements. The display device 300 of FIG. 3 includes the illuminator 102 having the light source 104, the transparent lightguide 106 for spreading the light 108 emitted by the light source 104 in XY plane, and the array of gratings 110 optically coupled to the transparent lightguide 106 for out-coupling portions 112 of the light 108 propagating in the transparent lightguide 106. The LC layer 116 is disposed downstream of the illuminator 102. The LC layer 116 includes the array of polarization-tuning pixels 118 in the thin layer 116 of LC fluid between first 121 and second 122 substrates. A linear transmission polarizer 328 is disposed downstream of the LC cell 120.

The display device 300 of FIG. 3 further includes a reflective offset-to-angle element 330 configured to redirect the light portions 112 propagated through the LC layer 116 back through the transparent lightguide 106 (i.e. right to left in FIG. 3) for forming the image in angular domain at an eyebox 326 on an opposite side of the transparent lightguide 106 as the reflective offset-to-angle element 330. In other words, the eyebox 326 and the offset-to-angle element 330 are disposed on opposite sides of the transparent lightguide 106. On their path, the light portions 112 propagate again through the linear transmission polarizer 328, the LC cell 120, and through the transparent lightguide 106. Any subsequent polarization change imparted by the LC cell 120 on the second propagation of the light portions 112 through the LC cell 120 (i.e. right to left propagation) will not matter, because there are no polarizers downstream of the LC cell 120 on the backward optical path of the light portions 112, and accordingly the image in angular domain formed by the reflective offset-to-angle element 330 at the eyebox 326 will be essentially not distorted. It is to be noted that throughout this specification, the term "downstream" when referred to an optical path means that the light beam(s) propagating along the optical path impinge on the downstream element after they impinge onto an upstream element regardless of a geometrical disposition of elements, because the direction of propagation might change as the light propagates. In accordance with this definition, the eyebox 326 is always disposed downstream of the reflective offset-to-angle element 330, even though it is disposed in FIG. 3 to the left of the transparent lightguide 106, and to the left of the reflective offset-to-angle element 330.

Referring to FIG. 4, a display device 400 is an implementation of the display device 300 of FIG. 3. Similarly to the display device 300 of FIG. 3, the display device 400 of FIG. 4 includes the illuminator 102 having the light source 104 and the transparent lightguide 106 for spreading the illuminating light in XY plane with and the array of gratings for out-coupling the light portions 112. The LC layer 116 is disposed downstream of the illuminator 102. The linear transmission polarizer 328 is disposed downstream of the LC cell 120.

A reflective offset-to-angle element 430 of the display device 400 includes a first component 431 in form of a meniscus lens having a reflective polarizer 436 on one surface and a quarter-wave plate (QWP) coating 438 on the other, opposed surface, and a second component 432 downstream of the first component 431 in form of a meniscus lens including a reflector layer 440 on its outer convex surface. The function of the reflective offset-to-angle element 430 is to reflect the light portions 112 back through the LC layer 116 and the transparent illuminator 102 to form an image in angular domain at an eyebox 426 for direct observation by a user's eye 480.

Figure 4A:
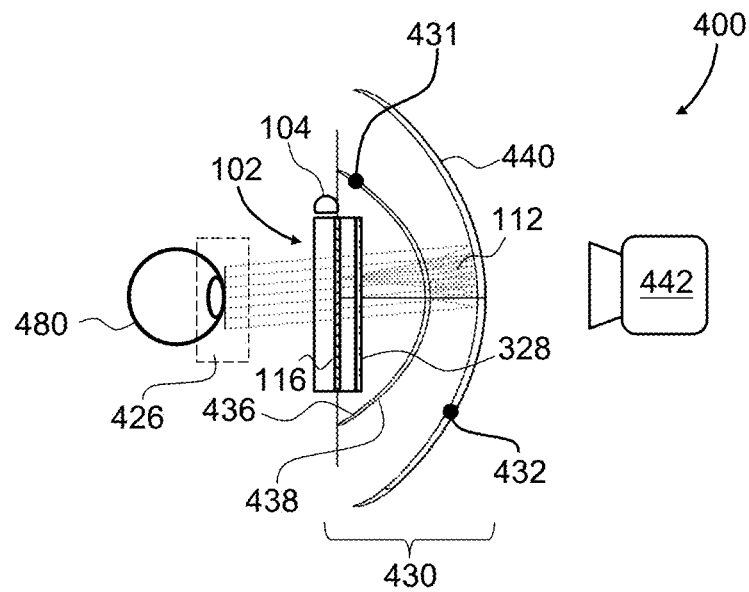
FIG. 4A is a schematic cross-sectional view of a display device embodiment of FIG. 3 showing a detailed configuration of the reflective offset-to-angle element.
Figure 4B:
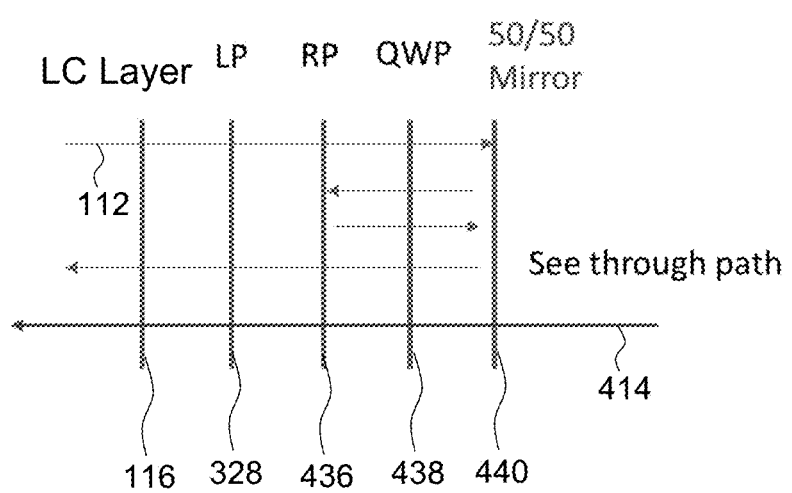
FIG. 4B is an optical polarization diagram showing the succession of light propagation through the reflective offset-to-angle element of FIG. 4A.

The optical path of the light portions 112 inside the reflective offset-to-angle element 430 of the display device 400 will now be described with reference to the optical polarization diagram of FIG. 4B and the schematic cross-sectional view of the display device 400 in FIG. 4A. The out-coupled light portions 112 propagate through the LC layer 116 and the linear transmissive polarizer 328. The latter causes the light portions 112 to have a first linear polarization state. The light portions 112 propagate through the reflective polarizer 436 which is oriented to pass through light in the first linear polarization state. Then, the light portions 112 propagate through the QWP coating 438, get reflected by the reflector layer 440, and propagate back through the QWP coating 438, which at this point changes the polarization of the light portions 112 to a second, orthogonal linear polarization state, causing the reflective polarizer 436 to reflect the light portions to propagate again to the reflector layer 440 through the QWP coating 438 and get reflected by the reflector layer 440. After fourth pass through the QWP coating 438, the light portions 112 are converted back to the first polarization state, and thus the light portions 112 propagate back through reflective polarizer 436, the linear transmissive polarizer 328, the LC layer 116, and the transparent illuminator 102, forming an image in angular domain at the eyebox 426. When the light portions 112 propagate back through the LC layer 116, they may change their polarization, but that does not matter since there are no polarizers between the LC layer 116 and the eyebox 426.

In the embodiment shown, the reflector layer 440 is a partial reflector, e.g. a 50/50 mirror, which makes the entire assembly translucent, i.e. permeable to external light 414. An eye-tracking camera 442 (FIG. 4A) may be placed behind the reflector layer 440 for taking images of the user's eye 480 at the eyebox 426 through the offset-to-angle element 430, the LC layer 116, and the illuminator 102. In other embodiments, the eye-tracking camera 442 is placed elsewhere, and the reflector layer 440 is a full reflector, which increases the throughput of the offset-to-angle element 430 by approximately a factor of two.

Figure 5A:
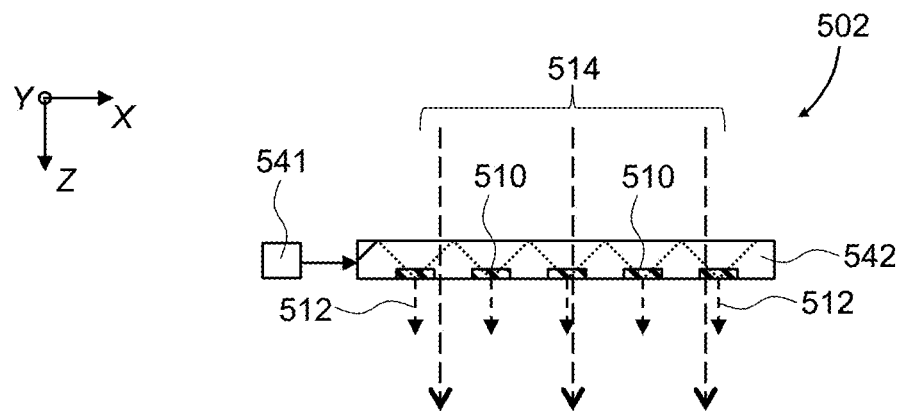
FIG. 5A is a side cross-sectional view of a transparent illuminator based on a two slab lightguides with 1D expansion of the light beam.
Figure 5B:
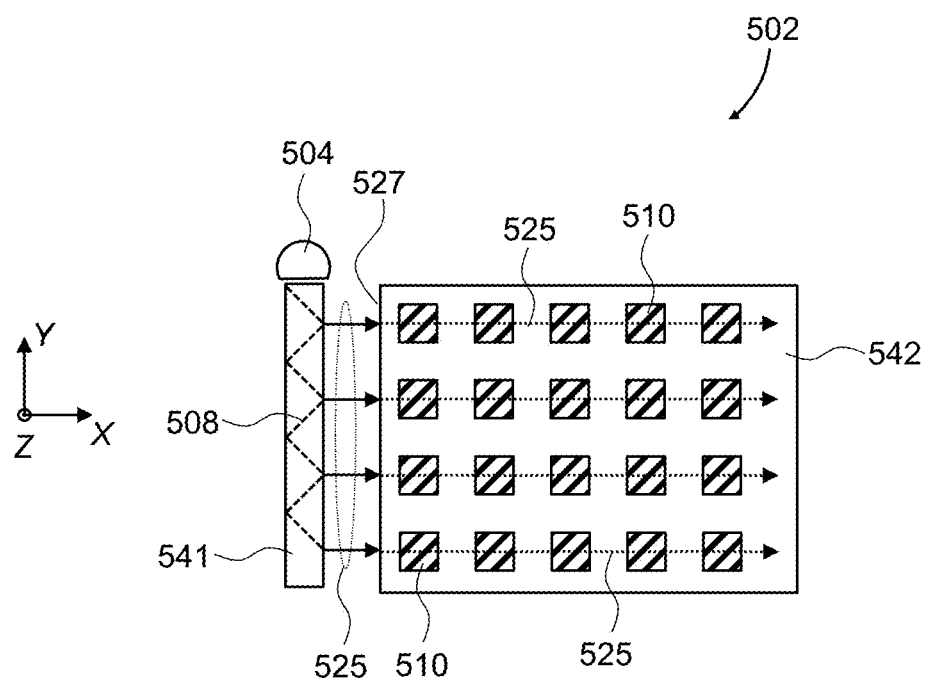
FIG. 5B is a top view of the transparent illuminator of FIG. 5A.

The illuminator 102 may be constructed in a variety of ways. Referring to FIGS. 5A and 5B for a non-limiting example, an illuminator 502 includes a light source 504 optically coupled to a first slab lightguide 541, which is optically coupled to a second slab lightguide 542. The first 541 and second 542 slab lightguides are made of a transparent material, and may be transparent to external light. The first 541 and second 542 slab lightguides expand light 508 emitted by the light source 504 in XY plane by a series of consecutive reflections of the light 508 from outer parallel surfaces of a transparent slab substrate. Specifically, first 541 and second 542 slab lightguides expand the light 508 in Y- and X-directions respectively, by propagating the light 508 in a zigzag pattern by a series of consecutive total internal reflections from opposed parallel surfaces of the first 541 and second 542 slab lightguides. The first slab lightguide 541 receives the light 508 from the light source 504 and produces a Y-expanded light beam 525 from portions of the light 508 out-coupled by a grating out-coupler, not shown for brevity. The Y-expanded light beam 525 is coupled into the second slab lightguide 542 along an edge 527 parallel to Y-axis. The Y-expanded light beam 525 is then expanded by the second slab lightguide 542 along X-axis, with light portions 512 propagated through and partially out-coupled by gratings 510, which are optically coupled to, and supported by the second slab lightguide 542. Together, the first 541 and second 542 slab lightguides expand the light 508 along XY plane, which is parallel to the plane of the LC layer 116 (FIG. 1). The out-coupled light portions 512 (FIG. 5A) propagate through the LC layer 116 (FIG. 1). The second slab lightguide 542 remains transparent to external light 514.

Figure 6:
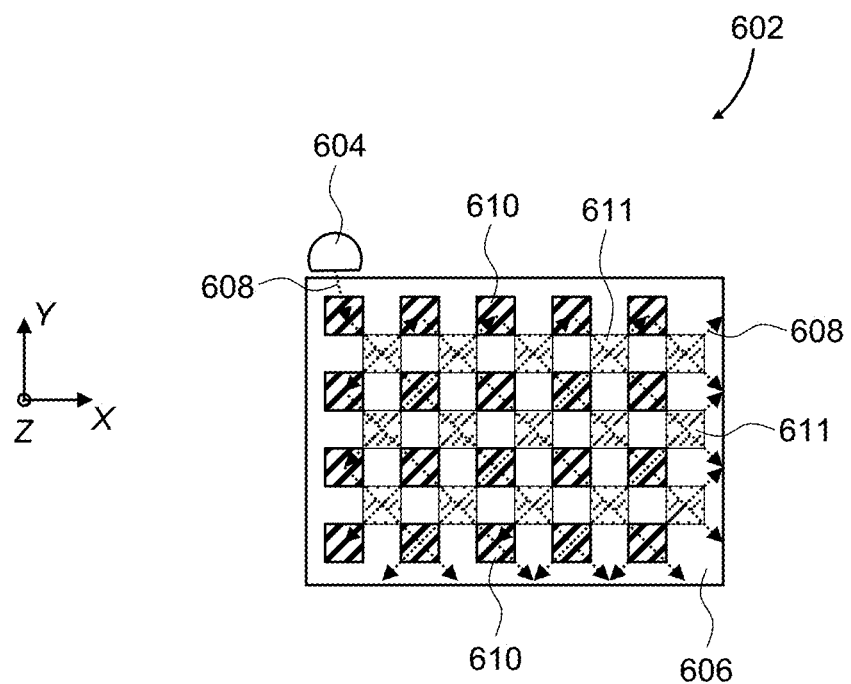
FIG. 6 is a top view of a transparent illuminator based on a slab lightguide with a 2D beam expansion.

Referring to FIG. 6, an illuminator 602 is another example implementation of the illuminator 102 of FIG. 1. The illuminator 602 of FIG. 6 includes a light source 604 coupled to a transparent slab lightguide 606. The transparent slab lightguide 606 supports first gratings 610 configured to out-couple light portions propagating through individual polarization-tuning pixels of the LC layer. The transparent slab lightguide 606 (FIG. 6) further includes second gratings 611, which are configured to redirect the light 608 to propagate within the transparent slab lightguide 606 so as to expand in XY plane by propagating the light 608 in a zigzag pattern by a series of consecutive total internal reflections from opposed parallel surfaces of the transparent slab lightguide 606. The light 608 expands in XY plane, i.e. propagates in XY plane, by a series of total internal reflections from outer parallel surfaces of the transparent slab lightguide 606.

Figure 7:
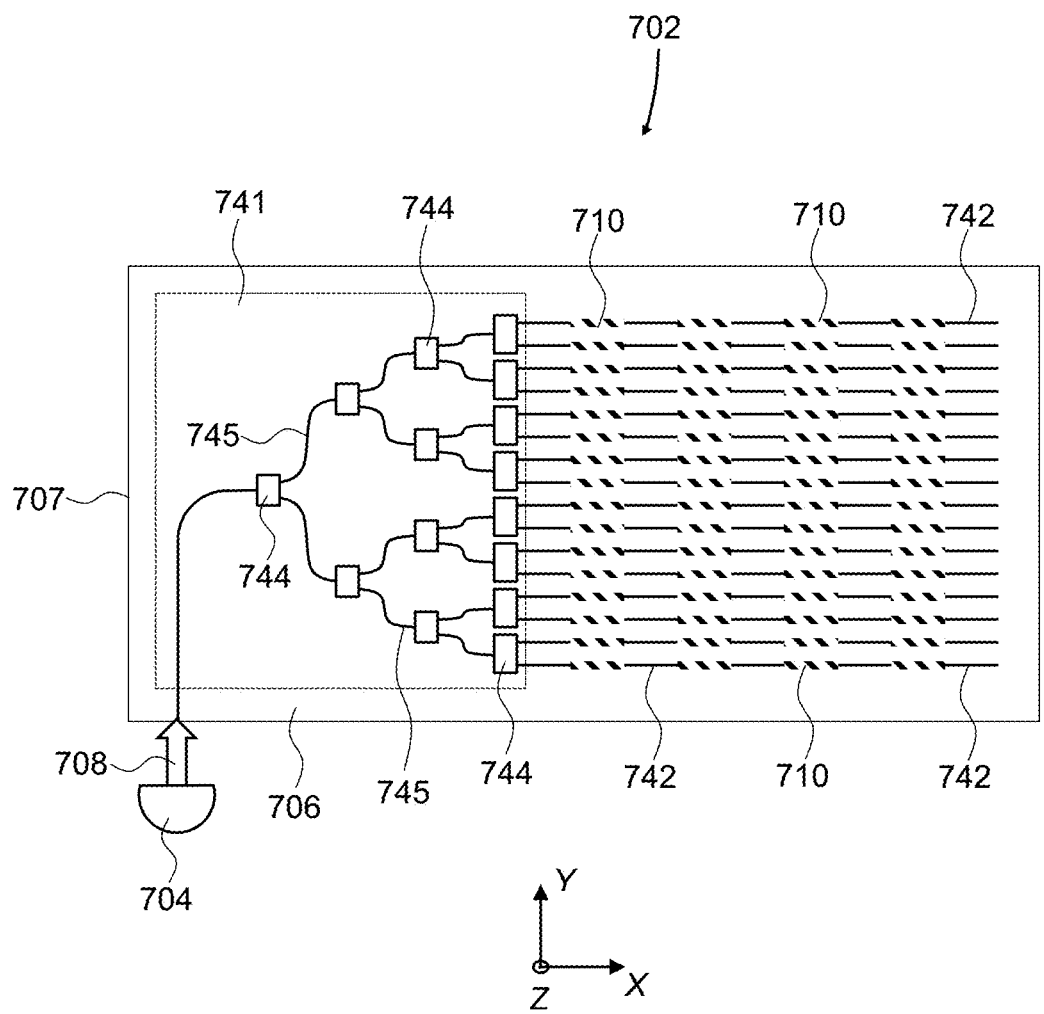
FIG. 7 is a top view of a transparent illuminator based on a photonic integrated circuit (PIC)

Turning to FIG. 7, an illuminator 702 includes a light source 704 for providing a light beam 708 to a transparent lightguide 706. The transparent lightguide 706 includes a photonic integrated circuit (PIC) supported by a substrate 707. The PIC include an optical dispatching circuit 741 coupled to the light source 704, and an array of linear waveguides 742 running parallel to one another. The optical dispatching circuit 741 is based on linear waveguides and is configured to receive and split the light beam 708 into a plurality of sub-beams for propagation in individual linear waveguides 742. Herein, the term "linear waveguide" denotes a waveguide that bounds the light propagation in two dimensions, like a light wire. A linear waveguide may be straight, curved, etc.; in other words, the term "linear" does not mean a straight waveguide section. One example of a linear waveguide is a ridge-type waveguide.

To split the light beam 708 into a plurality of sub-beams, the optical dispatching circuit 741 may include a binary tree of 1×2 waveguide splitters 744 coupled to one another by linear waveguides 745 supported by the substrate 707. Other configurations of the optical dispatching circuit 741 are possible, e.g. they may be based on a tree of Mach-Zehnder interferometers, and may include separate waveguide trees for light source components at different wavelengths, e.g. wavelengths of different color channels.

The linear waveguides 742 run parallel to one another along the polarization-tuning pixels 118 (FIG. 1) propagating the sub-beams in the linear waveguides 742 (FIG. 7). The transparent lightguide 706 further includes an array of out-coupling gratings 710 optically coupled to the linear waveguides 742 for out-coupling portions of the sub-beams propagating in the linear waveguides 742. The out-coupling gratings 710 are disposed parallel to the XY plane as shown, and perform a same or similar function as the out-coupling gratings 110 of the lightguide 106 of the illuminator 102 of FIG. 1. Specifically, the out-coupling gratings 710 out-couple the sub-beam portions from the respective linear waveguides 742 to propagate through individual polarization-tuning pixels 118 of the LC layer 116.

Figure 8:
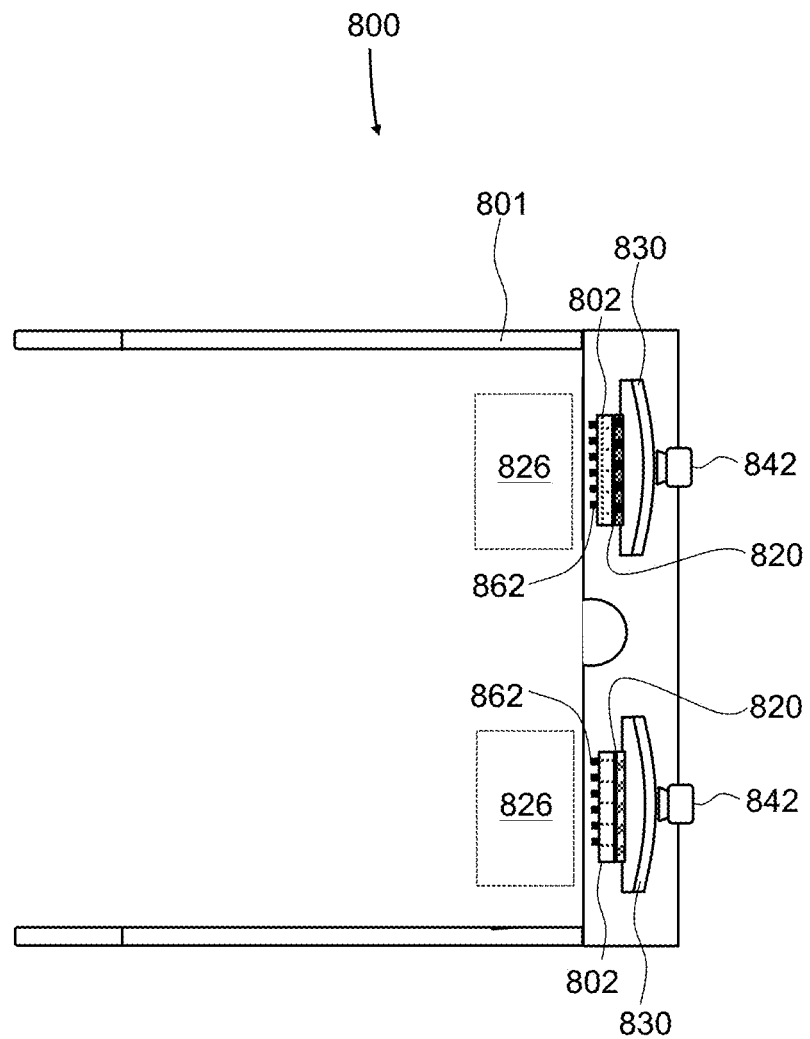
FIG. 8 is a view of an augmented reality (AR) display of this disclosure having a form factor of a pair of eyeglasses.

Referring now to FIG. 8, a virtual reality (VR) near-eye display 800 includes a frame 801 supporting, for each eye: an illuminator 802 including any of the illuminators disclosed herein; an LC cell 820 including an array of polarization-tuning pixels, where positions of the out-coupling gratings in the illuminator 802 are coordinated with positions of the polarization-tuning pixels of the LC cell 820; a reflective offset-to-angle element 830 for converting the image in linear domain generated by the LC cell 820 into an image in angular domain at an eyebox 826. The reflective offset-to-angle element 830 includes a translucent mirror, similar to the reflective offset-to-angle element 430 of FIG. 4A, which enables an eye-tracking camera 842 to be placed directly behind the reflective offset-to-angle element 830, i.e. farther away from the eyebox 826 than the reflective offset-to-angle element 830. A plurality of illuminators 862 (shown as black dots) can be placed onto the side of the illuminator 802 that faces the eyebox 826.

The purpose of the eye-tracking cameras 842 is to determine position and/or orientation of both eyes of the user. The illuminators 862 illuminate the eyes at the corresponding eyeboxes 826, allowing the eye-tracking cameras 842 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the illuminators 862, the latter may be made to emit light invisible to the user. For example, infrared light may be used to illuminate the eyeboxes 826.

Figure 9:
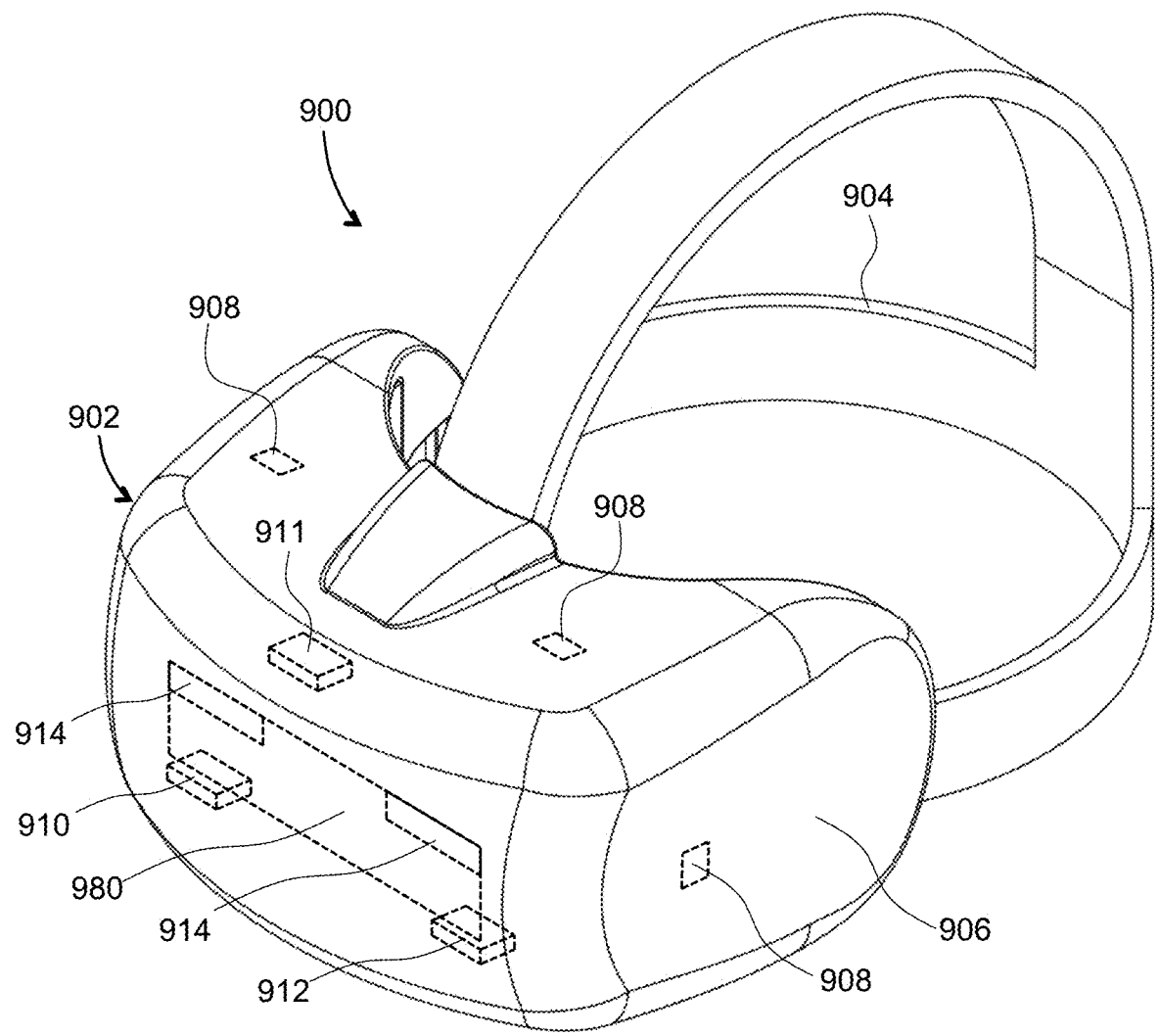
FIG. 9 is a three-dimensional view of a head-mounted display (HMD) of this disclosure.

Turning to FIG. 9, an HMD 900 is an example of an AR/VR wearable display system which encloses the user's face, for a greater degree of immersion into the AR/VR environment. The HMD 900 may generate the entirely virtual 3D imagery. The HMD 900 may include a front body 902 and a band 904 that can be secured around the user's head. The front body 902 is configured for placement in front of eyes of a user in a reliable and comfortable manner. A display system 980 may be disposed in the front body 902 for presenting AR/VR imagery to the user. The display system 980 may include any of the display devices and illuminators disclosed herein. Sides 906 of the front body 902 may be opaque or transparent.

In some embodiments, the front body 902 includes locators 908 and an inertial measurement unit (IMU) 910 for tracking acceleration of the HMD 900, and position sensors 912 for tracking position of the HMD 900. The IMU 910 is an electronic device that generates data indicating a position of the HMD 900 based on measurement signals received from one or more of position sensors 912, which generate one or more measurement signals in response to motion of the HMD 900. Examples of position sensors 912 include: one or more accelerometers, one or more gyroscopes, one or more magnetometers, another suitable type of sensor that detects motion, a type of sensor used for error correction of the IMU 910, or some combination thereof. The position sensors 912 may be located external to the IMU 910, internal to the IMU 910, or some combination thereof.

The locators 908 are traced by an external imaging device of a virtual reality system, such that the virtual reality system can track the location and orientation of the entire HMD 900. Information generated by the IMU 910 and the position sensors 912 may be compared with the position and orientation obtained by tracking the locators 908, for improved tracking accuracy of position and orientation of the HMD 900. Accurate position and orientation is important for presenting appropriate virtual scenery to the user as the latter moves and turns in 3D space.

The HMD 900 may further include a depth camera assembly (DCA) 911, which captures data describing depth information of a local area surrounding some or all of the HMD 900. The depth information may be compared with the information from the IMU 910, for better accuracy of determination of position and orientation of the HMD 900 in 3D space.

The HMD 900 may further include an eye tracking system 914 for determining orientation and position of user's eyes in real time. The obtained position and orientation of the eyes also allows the HMD 900 to determine the gaze direction of the user and to adjust the image generated by the display system 980 accordingly. The determined gaze direction and vergence angle may be used to adjust the display system 980 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 902.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
   an illuminator comprising a light source, a transparent lightguide for spreading light emitted by the light source along a plane parallel to the transparent lightguide, and an array of gratings optically coupled to the transparent lightguide for out-coupling portions of the light propagating in the transparent lightguide;
   a liquid crystal (LC) layer downstream of the illuminator, the LC layer comprising an array of polarization-tuning pixels, wherein positions of the gratings are coordinated with positions of the polarization-tuning pixels to propagate the portions of the light out-coupled from the transparent lightguide by the gratings through the corresponding polarization-tuning pixels; an eyebox downstream of the LC layer; and
   an offset-to-angle element in an optical path between the LC layer and the eyebox, for
   converting an image in linear domain at the LC layer into an image on angular domain at the eyebox.

2. The display device of claim 1, wherein the gratings are configured for at least partial focusing of the light portions through the corresponding polarization-tuning pixels.

3. The display device of claim 1, wherein the light source is configured to emit the light in a first polarization state, wherein the transparent lightguide substantially preserves the first polarization state of the light emitted by the light source.

4. The display device of claim 1, wherein the light source is configured to emit the light at a wavelength of a first color channel.

5. The display device of claim 4, wherein the light source is configured to emit the light at wavelengths of second and third color channels, wherein in operation, the light of the first, second, and third color channel is emitted in a time-sequential manner.

6. The display device of claim 1, further comprising at least one of:
   a grid layer adjacent the LC layer, for defining boundaries of the polarization-tuning pixels of the array of polarization-tuning pixels; or
   a substrate adjacent the LC layer, the substrate comprising an array of transparent electrode segments defining the array of polarization-tuning pixels.

7. The display device of claim 1, further comprising a polarizer downstream of the LC layer, for transmitting light in a first polarization state while rejecting light in a second, orthogonal polarization state.

8. The display device of claim 1, wherein the offset-to-angle element is configured to redirect the light portions propagated through the LC layer back through the transparent lightguide for forming the image in angular domain, wherein the eyebox and the offset-to-angle element are disposed on an opposite sides of the transparent lightguide.

9. The display device of claim 8, wherein the offset-to-angle element comprises:
   a first component comprising a reflective polarizer; and
   a second component downstream of the first component, the second component comprising a reflector layer;

wherein in operation, the out-coupled light portions propagate through the reflective polarizer, get reflected by the reflector layer, propagate back to the reflective polarizer, get reflected thereby, propagate again to the reflector layer, get reflected thereby, propagate back through the transparent lightguide, and form the image in angular domain at the eyebox.

10. The display device of claim 9, wherein the reflector layer comprises a full reflector.

11. The display device of claim 9, wherein the reflector layer comprises a partial reflector, the display device further comprising an eye-tracking camera behind the partial reflector for taking images of a user's eye at the eyebox through the offset-to-angle element.

12. The display device of claim 1, wherein the transparent lightguide comprises a slab of transparent material for propagating the light therein in a zigzag pattern by a series of consecutive total internal reflections from opposed parallel surfaces of the slab, wherein the array of gratings is supported by the slab.

13. The display device of claim 1, wherein the transparent lightguide comprises:
a substrate;
a dispatching circuit supported by the substrate; and
an array of linear waveguides supported by the substrate and running along polarization- tuning pixels of the array of polarization-tuning pixels;
wherein the dispatching circuit is configured for receiving the light from the light source and split the light between the linear waveguides; and
wherein the gratings are optically coupled to the linear waveguides for out-coupling the light portions from the linear waveguides to propagate through corresponding polarization-tuning pixels of the array of polarization-tuning pixels.

14. A display device comprising:
an illuminator comprising a light source, a slab of transparent material coupled to the light source for propagating the light therein in a zigzag pattern by a series of consecutive total internal reflections from opposed parallel surfaces of the slab, and an array of gratings supported by the slab for out-coupling portions of the light propagating in the slab;
a liquid crystal (LC) layer optically coupled to the illuminator, the LC layer comprising an array of polarization-tuning pixels, wherein positions of the gratings are coordinated with positions of the polarization-tuning pixels to propagate the portions of the light out-coupled from the slab of transparent material by the gratings through the corresponding polarization-tuning pixels;
an eyebox downstream of the LC layer; and
an offset-to-angle element in an optical path between the LC layer and the eyebox, for converting an image in linear domain at the LC layer into an image on angular domain at the eyebox.

15. The display device of claim 14,
wherein the offset-to-angle element is reflective, wherein the reflective offset-to-angle element is configured to redirect the light portions propagated through the LC layer back through the slab of transparent material for forming the image in angular domain, wherein the eyebox and the offset-to-angle element are disposed on opposite sides of the slab of transparent material.

16. The display device of claim 15, wherein the reflective offset-to-angle element comprises:
a first component comprising a reflective polarizer; and
a second component downstream of the first component, the second component comprising a reflector layer;
wherein in operation, the out-coupled light portions propagate through the reflective polarizer, get reflected by the reflector layer, propagate back to the reflective polarizer, get reflected thereby, propagate again to the reflector layer, get reflected thereby, propagate back through the slab of transparent material, and form the image in angular domain at the eyebox.

17. A display device comprising:
an illuminator comprising a light source and a transparent lightguide comprising a substrate, a dispatching circuit supported by the substrate, an array of linear waveguides supported by the substrate, and an array of gratings optically coupled to the array of linear waveguides, wherein the dispatching circuit is configured for receiving the light from the light source and split light emitted by the light source between the linear waveguides, and wherein the gratings are configured to out-couple portions of the light from the linear waveguides;
a liquid crystal (LC) layer optically coupled to the illuminator, the LC layer comprising an array of polarization-tuning pixels, wherein the linear waveguides are running along the polarization-tuning pixels of the LC layer, and wherein positions of the gratings are coordinated with positions of the polarization-tuning pixels to propagate the portions of the light beams out-coupled from the linear waveguides by the gratings through the corresponding polarization-tuning pixels;
an eyebox downstream of the LC layer; and
an offset-to-angle element in an optical path between the LC layer and the eyebox, for converting an image in linear domain at the LC layer into an image on angular domain at the eyebox.

18. The display device of claim 17,
wherein the offset-to-angle element is reflective, wherein the reflective offset-to-angle element is configured to redirect the light portions propagated through the LC layer back through the transparent lightguide for forming the image in angular domain, wherein the eyebox and the offset-to-angle element are disposed on opposite sides of the transparent lightguide.

19. The display device of claim 18, wherein the reflective offset-to-angle element comprises:
a first component comprising a reflective polarizer; and
a second component downstream of the first component, the second component comprising a reflector layer;
wherein in operation, the out-coupled light portions propagate through the reflective polarizer, get reflected by the reflector layer, propagate back to the reflective polarizer, get reflected thereby, propagate again to the reflector layer, get reflected thereby, propagate back through the transparent lightguide, and form the image in angular domain at the eyebox.

* * * * *